(12) United States Patent
Ouchi

(10) Patent No.: US 7,106,452 B2
(45) Date of Patent: Sep. 12, 2006

(54) MEASURING DEVICE AND MEASURING METHOD

(75) Inventor: Chidane Ouchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 09/934,713

(22) Filed: Aug. 23, 2001

(65) Prior Publication Data

US 2002/0024673 A1 Feb. 28, 2002

(30) Foreign Application Priority Data

Aug. 31, 2000 (JP) ....................... 2000-263969

(51) Int. Cl.
*G07B 9/02* (2006.01)

(52) U.S. Cl. .................................................. 356/495
(58) Field of Classification Search ................ 356/495, 356/487, 512, 513, 514, 515, FOR. 113, 356/489

See application file for complete search history.

(56) References Cited

U.S. PATENT DOCUMENTS

| | | | | |
|---|---|---|---|---|
| 3,694,088 A | * | 9/1972 | Gallagher et al. | 356/495 |
| 5,042,951 A | * | 8/1991 | Gold et al. | 356/369 |
| 5,420,717 A | * | 5/1995 | Tabata | 359/371 |
| 5,995,223 A | * | 11/1999 | Power | 356/495 |

OTHER PUBLICATIONS

Fincham, Freeman, "Optics" 1980, Butterworths Inc, pp. 351–353.*
Brown, Earle B. "Modern Optics", 1965, Reinhold Publishing Corporation pp. 47–48.*
U.S. Appl. No. 09/638885.*
D. Malacara, Optical Shop Testing $2^{nd}$ Edition, Wiley Canada Publisher, pp. 577–580 (1992).

* cited by examiner

*Primary Examiner*—Gregory J. Toatley, Jr.
*Assistant Examiner*—Patrick Connolly
(74) *Attorney, Agent, or Firm*—Fitzpatrick, Cella, Harper & Scinto

(57) ABSTRACT

A wavefront measuring device is disclosed which is capable of measuring an average wavefront and the retardation of a lens including birefringence. The measuring device includes a light source for emitting a linearly polarized light; a polarization orientation setting member for switching the polarization orientation of the light flux from the light source between at least two orientations; a light synthesizing member for synthesizing the light flux after passing the light fluxes through an object to be measured and a reference surface; an analyzer for switching the polarization orientation so as to pass only the same polarized component as the polarized light incident on the object to be measured; an image pickup member for detecting interference information of the light flux obtained through the analyzer; and a calculating section for calculating the average wavefront and/or the retardation of the object to be measured.

11 Claims, 3 Drawing Sheets

MEASURING DEVICE AND MEASURING METHOD

BACKGROUND OF THE INVENTION

1. Field of the Invention

The present invention relates to a measuring device and a measuring method for measuring the wavefront aberration of optical members such as lenses, transparent members, and mirrors.

2. Description of the Related Art

In recent years, high-performance optical systems having low remaining aberration have been required in a variety of fields. For example, in the photolithography process wherein semiconductor devices and the like are produced, a projection lens (projection optical system) having a superior imaging performance, and suppressing wavefront aberration, have been demanded in order to correctly transfer a circuit pattern formed on a reticle or a photo-mask (hereinafter, collectively referred to as reticles) at a predetermined magnification (reduction ratio) to a semiconductor wafer or the like on which a photosensitive material is applied. In particular, recently, to meet the demand for a further miniaturization of semiconductor device, the minimum pattern that a projection lens can transfer, is frequently transferred using the imaging capability of the projection lens to the limit. In a projection lens, therefore, it is necessary to bring the remaining wavefront aberration as nearly zero as possible. For this purpose, endeavors to reduce the remaining aberration are being made from the viewpoints of both optical design and production.

Hitherto, as a measuring device for measuring the wavefront aberration with a high accuracy, interferometers have been frequently used. The light flux used in conventional interferometric sensing has been one in a particular polarized state of light, for example, a linearly polarized light in a certain orientation, or either of a right-handed circularly polarized lights and left-handed circularly polarized lights.

In the inspection of the wavefront aberration of the projection lens for use in a semiconductor exposure system, the performance of the projection lens with respect to incident lights in various polarization states must be grasped very strictly. In this case, due consideration must be given to the influence of the wavefront configuration caused by a slight birefringence existing in a projection lens (lens to be measured). For this purpose, it is necessary to measure the amount of retardation of the lens to be measured caused by birefringence and the average wavefront of the wavefronts separated by the birefringence (hereinafter, referred to as average wavefront). However, in the conventional measuring method, wherein light flux in one polarization state is used, the wavefront of a lens to be measured in which birefringence exists, cannot be measured with a high accuracy.

SUMMARY OF THE INVENTION

Accordingly, it is an object of the present invention to provide a measuring device and a measuring method which allow the retardation and the average wavefront of lens or other optical materials wherein birefringence exists, to be measured with a high accuracy.

Further objects, features, and advantages of the present invention will become apparent from the following description of the preferred embodiments with reference to the attached drawings.

DESCRIPTION OF THE PREFERRED EMBODIMENTS

Figure 1:
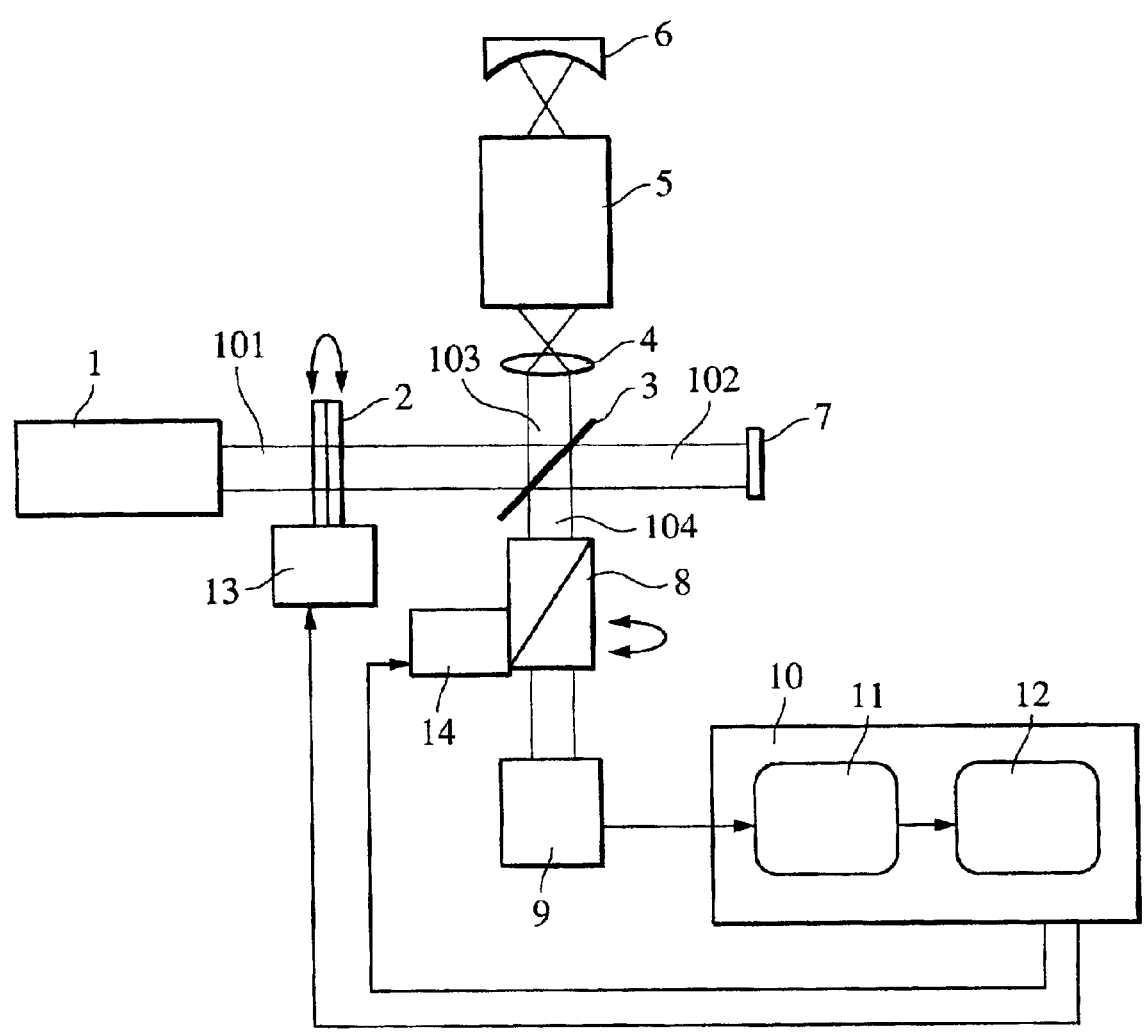
FIG. 1 is a schematic view showing the main section of a first embodiment in accordance with the present invention.

FIG. 1 is a schematic view showing the main section of a wavefront measuring device in accordance with a first embodiment of the present invention. In this embodiment, the wavefront aberration of a lens as an object to be measured, is measured using a Twyman-Green-type interferometer. As an object to be measured, a prism, parallel plates, a mirror, or the like may be used. Referring to FIG. 1, a light flux 101 from a laser 1 as light source means which radiates a linearly polarized light flux as a light source passes through a polarization orientation setting member 2 formed of, for example, a ½ wavelength plate. The polarization orientation setting member 2 is arranged so that the orientation of the polarization plane of a light flux 101 can be switched between two mutually orthogonal orientations by a rotating mechanism 13 for use in the polarization orientation setting member. After passing through the polarization orientation setting member 2, the light flux 101 is separated by a beam splitter (light re-combining means) 3 into a reference light 102 travelling to a reference mirror 7 and a light 103 to be inspected travelling to a collimator lens 4. The reference light 102 which has passed through the beam splitter 3 is reflected from the reference mirror 7, and returns to the beam splitter 3. On the other hand, the light 103 to be inspected is condensed at one point by a collimator lens 4, then passes through a lens 5 to be measured, and after being reflected from a concave mirror 6, retraces its optical path. That is, the light 103 to be inspected again passes through the lens 5 to be measured and the collimator lens 4, and returns to the beam splitter. The reference light 102 which has passed through the beam splitter 3 is reflected from the reference mirror 7 and returns to the beam splitter 3. Here, at the beam splitter 3, the light 103 to be inspected is combined with the reference light 102 reflected here, to form an interference light 104 including the remaining wavefront information of the lens 5 to be measured. The interference light 104 passes through an analyzer 8 which is orientation-set by an analyzer rotating mechanism 14 so as to allow only a predetermined polarized component pass, and is irradiated on the image pickup means of a camera 9 for use in photographing interference patterns. The image signals based on the interference pattern obtained by the image pickup means of the camera 9 are transmitted to a computer 10. The computer 10 has calculating means including wavefront calculation means 11 and birefringence calculating means 12. The wavefront calculation means 11 calculates the transmitted wavefronts of the lens 5 to be measured in each of polarized lights by processing the image signals based on these interference patterns by the same method as that of conventional interferometers. The birefringence calculating means 12 calculates the retardation existing in the lens 5 to be measured and the average wavefront, from the transmitted wavefronts of the two polarized lights which have been calculated by the wavefront calculation means 11. The computer 10 also controls the rotating mechanism 13 for use in the polarization orientation setting member and switches the orientation of the polarization plane of the light 103 to be inspected which is made incident on the lens 5 to be measured, and that of the polarization plane of the reference light 102. Furthermore, the computer 10 controls the analyzer rotating mechanism 14 and sets the orientation of the transmitted polarization plane of the analyzer 8 at the same orientation as that of the polarization of the light 103 to be inspected when it is made incident on the lens 5 to be measured. Meanwhile, in the figure, a phase shift mechanism for wavefront measurement is omitted.

In the interferometer in the wavefront measuring device in accordance with this embodiment, the remaining wavefront aberration of the lens to be measured is obtained with a high accuracy, utilizing the polarization orientation setting member which can switch the polarization orientation of the light incident on the lens to be measured between two mutually orthogonal orientations; the analyzer which allows only the same polarized component as that of the incident light pass, out of lights from the lens to be measured; and the birefringence calculating means which calculates the retardation and the average wavefront, from the wavefront measurement in the two polarization states switched.

Next, the specific calculating procedure when determining the retardation existing in the lens 5 to be measured, and the average wavefront, from the transmitted wavefronts of the two polarized lights which have been calculated by the wavefront calculation means 11 in the birefringence calculating means 12.

Figure 2:
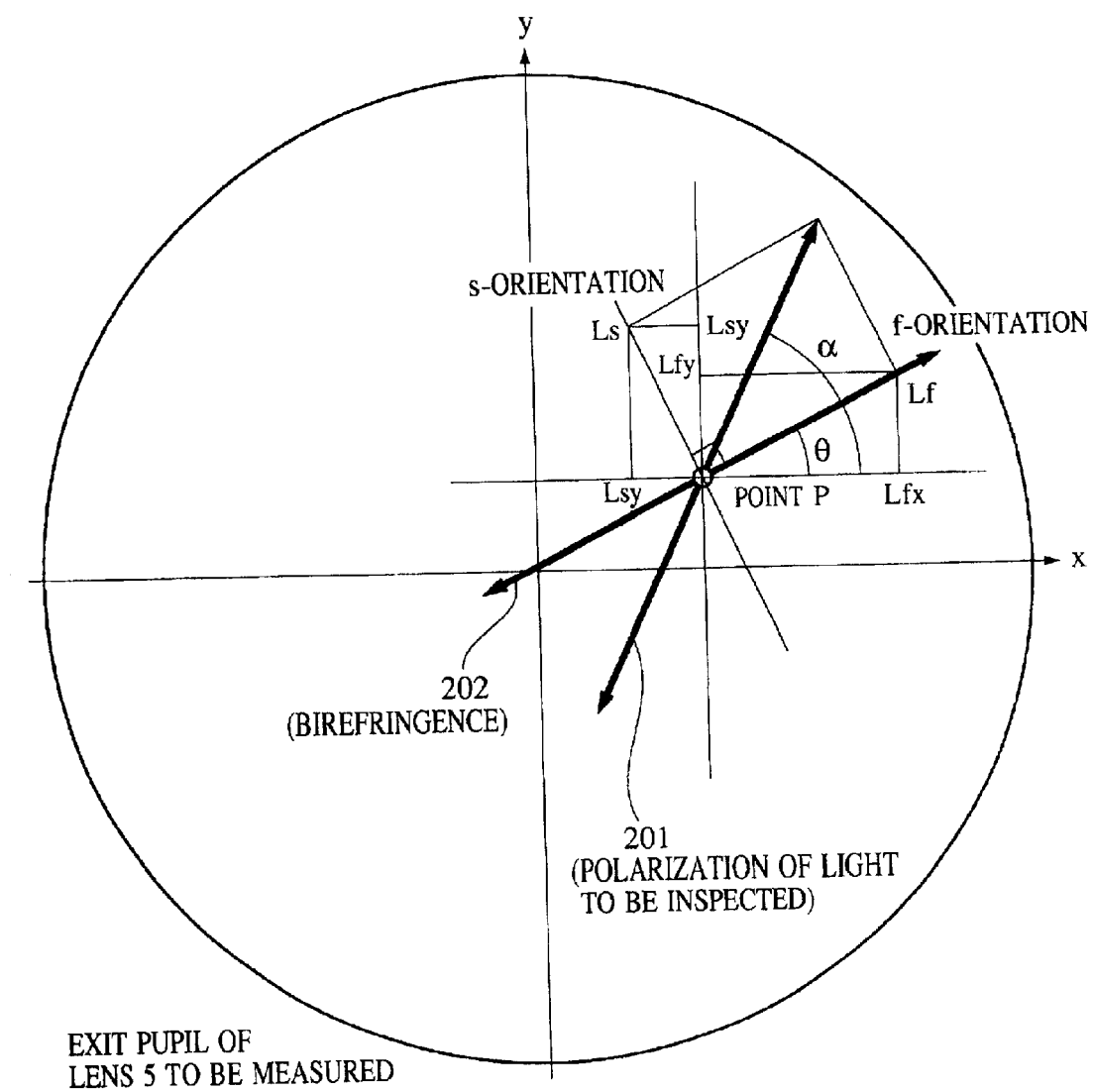
FIG. 2 is a diagram explaining the polarization state of a light on the exit pupil of the lens 5 to be measured shown in FIG. 1.

FIG. 2 represents the polarization state of a light on the exit pupil of the lens 5 to be measured. The arrow 201 indicates the polarization orientation of the light 103 to be inspected which travels toward the point P on the exit pupil, and the arrow 202 indicates the orientation of the summation of birefringence existing on the route through which the light passing through the point P passes while making a round trip through the lens 5 to be measured. Hereinafter, this orientation is referred to as "f-orientation", and the orientation perpendicular to this one is referred to as "s-orientation". Here, let the amplitude of the light 103 to be inspected be A, its polarization orientation be a, its angular frequency be $\omega$, the f-orientation component and the s-orientation component of the light to be inspected after passing through the lens 5 to be measured be Lf and Ls, respectively. Then, Lf and Ls can be expressed by the following equations in consideration of the phase difference between the amplitude and the reference light 102.

$$Lf = A\cos(\alpha-\theta)\cdot e^{i(\omega t+\phi_0+\phi)}$$

$$Ls = A\sin(\alpha-\theta)\cdot e^{i(\omega t+\phi_0-\phi)}$$

Here, $\phi_0$ is an average phase between the f-orientation component Lf and s-orientation component Ls, and corresponds to a phase generated by the difference in the optical path length between the light 103 to be inspected and the reference light 102. $\phi$ is the difference between the average phase $\phi_0$ and the f-orientation component Lf or the s-orientation component Ls, and equals a half value of the retardation $\phi r$. Hereinafter, the amplitude is normalized to 1, and the time-vibration term $e^{i\omega t}$ will be omitted. Therefore, $$Lf = A\cos(\alpha-\theta)\cdot e^{i(\phi_0+\phi)}$$

$$Ls = A\sin(\alpha-\theta)\cdot e^{i(\phi_0-\phi)}$$

When making the orientation of the analyzer 8 agree with the x-axis or the y-axis, the component of the light 103 to be inspected which passes through the analyzer 8 and which interferes with the reference light 102, is the x-axis component Lx or the y-axis component Ly, and it is the phases $\phi x$ and $\phi y$ thereof which is searched in the wavefront calculating means 12.

Here, letting Lfx and Lsx be an x-axis component of the f-orientation component Lf and the s-orientation component Ls, respectively, and Lfy and Lsy be an y-axis component of the f-orientation component Lf and the s-orientation component Ls, respectively, the following equations are obtained.

$$Lx = Lfx + Lsx$$

$$Ly = Lfy + Lsy$$

As can be seen from FIG. 2, $$Lfx = \cos\theta\cdot Lf$$

$$Lsx = \cos(\theta+\pi/2) = -\sin\theta\cdot Ls$$

$$Lfy = \sin\theta\cdot Lf$$

$$Lsy = \sin(\theta+\pi/2) = \cos\theta\cdot Ls$$

From these, Lx and Ly can be expressed as follows:

$$Lx = \cos\theta\cdot\cos(\alpha-\theta)\cdot e^{i(\phi_0+\phi)} - \sin\theta\cdot\sin(\alpha-\theta)\cdot e^{i(\phi_0-\phi)}$$

$$= e^{i\phi_0}\cdot(\cos\theta\cdot\cos(\alpha-\theta)\cdot e^{i\phi} - \sin\theta\cdot\sin(\alpha-\theta)\cdot e^{-i\phi})$$

$$Ly = \sin\theta\cdot\cos(\alpha-\theta)\cdot e^{i(\phi_0+\phi)} + \cos\theta\cdot\sin(\alpha-\theta)\cdot e^{i(\phi_0-\phi)}$$

$$= e^{i\phi_0}\cdot(\sin\theta\cdot\cos(\alpha-\theta)\cdot e^{i\phi} - \cos\theta\cdot\sin(\alpha-\theta)\cdot e^{-i\phi})$$

Hence, the phase $\phi x$ of Lx, and the phase $\phi y$ of Ly are expressed by the following equations, as functions of $\alpha$.

$$\phi x(\alpha) = \phi_0 + \tan^{-1}((\cos\theta\cdot\cos(\alpha-\theta)\cdot\sin\phi - \sin\theta\cdot\sin(\alpha-\theta)\cdot\sin(-\phi))/(\cos\theta\cdot\cos(\alpha-\theta)\cdot\cos\phi - \sin\theta\cdot\sin(\alpha-\theta)\cdot\cos(-\phi)))$$

$$= \phi_0 + \tan^{-1}(\tan\phi\cdot(\cos\theta\cdot\cos(\alpha-\theta)+\sin\theta\cdot\sin(\alpha-\theta))/(\cos\theta\cdot\cos(\alpha-\theta) - \sin\theta\cdot\sin(\alpha-\theta)))$$

$$\phi y(\alpha) = \phi_0 + \tan^{-1}((\sin\theta\cdot\cos(\alpha-\theta)\cdot\sin\phi + \cos\theta\cdot\sin(\alpha-\theta)\cdot\sin(-\phi))/(\sin\theta\cdot\cos(\alpha-\theta)\cdot\cos\phi + \cos\theta\cdot\sin(\alpha-\theta)\cdot\cos(-\phi)))$$

$$= \phi_0 + \tan^{-1}(\tan\phi\cdot(\sin\theta\cdot\cos(\alpha-\theta) - \cos\theta\cdot\sin(\alpha-\theta))/(\sin\theta\cdot\cos(\alpha-\theta)+\cos\theta\cdot\sin(\alpha-\theta)\cdot\cos(-+)))$$

First, by controlling the rotating mechanism 13 for use in the polarization orientation setting member 2 and the analyzer rotating mechanism 14, using the computer 10, the polarization orientation of the light 103 to be inspected when it is made incident, and that of the analyzer 8 are set to be each parallel to the x-axis, and a wavefront measurement is performed. In this case, since $\alpha=0$, $$\phi x(0) = \phi_0 - \tan^{-1}(\cos(2\theta)\cdot\tan\phi)$$

Next, the polarization orientation of the light 103 to be inspected when it is made incident, and that of the analyzer 8 are set to be each parallel to the y-axis, and a wavefront measurement is performed. In this case, since $\alpha=\pi/2$, $$\phi y(\pi/2) = \phi_0 + \tan^{-1}(\cos(2\theta)\cdot\tan\phi)$$

Hence, the average phase $\phi_0$ can also be obtained from the following expression.

$$\phi_0 = (\phi x(0) + \phi y(\pi/2))/2$$

On the other hand, the retardation $\phi r$ can be determined by the following equation.

$$\phi r = 2\phi$$
$$= -2\tan^{-1}(\tan((\phi x(0) - \phi y(\pi/2))/2)/\cos(2\theta))$$

Therefore, by calculating the average phase $\phi_0$ and the retardation $\phi r$ over the entire exit pupil, the average wavefront and the retardation over the entire exit pupil can be obtained. For calculating $\phi r$, it is necessary for the orientation $\theta$ of birefringence at any point on the exit pupil to be known. However, the birefringence of an axially symmetrical lens is known in most cases. Specifically, the orientation of the birefringence of a such lens, for example, agrees with the radial direction thereof, due to the producing method for the lens material thereof and the assembly process thereof.

In this manner, the retardation $\phi r$ and the average wavefront $\phi_0$ are obtained in this embodiment.

Figure 3:
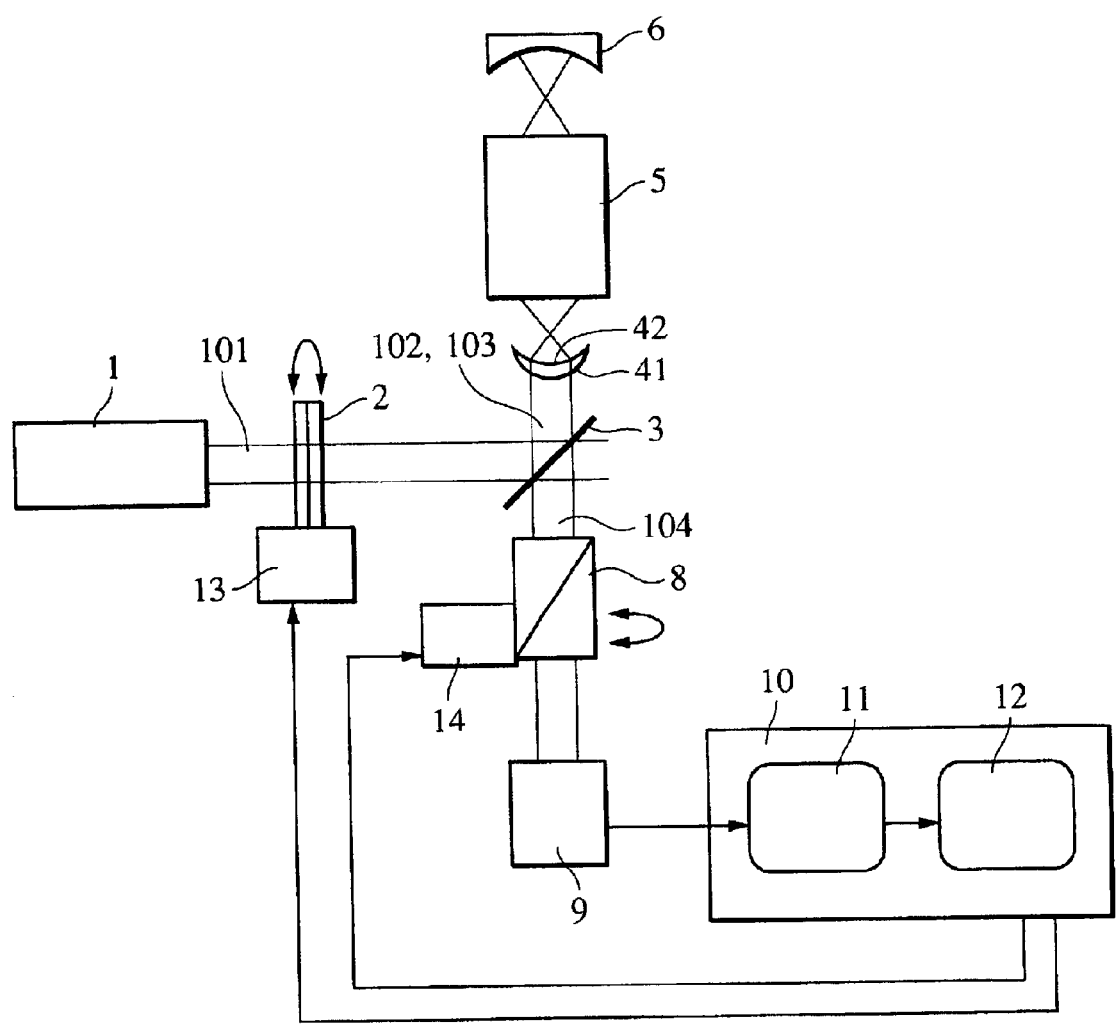
FIG. 3 is a schematic view showing the main section of a second embodiment in accordance with the present invention.

FIG. 3 is a schematic view showing the main section of a wavefront measuring device in accordance with a second embodiment of the present invention. In this embodiment, the wavefront aberration of a lens as an object to be measured, is measured using a Fizeau type interferometer. The Fizeau type interferometer requires a light source emitting light fluxes having a long coherent distance, but as is well known, allows a more accurate wavefront measurement than in the case of the Twyman-Green type interferometer. As compared with the interferometer in FIG. 1, the interferometer in this embodiment is provided with a Fizeau lens 41 in place of a collimator lens 4. The Fizeau lens 41 has a Fizeau surface 42, and the reflected lights from this Fizeau surface 42 becomes a reference light 102 travelling to the beam splitter 3. The light passing through the surface 42 makes a round trip to the lens 5 to be measured, and then becomes a light 103 to be inspected travelling to the beam splitter. The reference light 102 and the light 103 to be inspected are combined to form an interference pattern. Since the measurement principle and the measuring procedure thereafter are the same as those in the case of the Twyman-Green type interferometer in the first embodiment, description thereof will be omitted.

In the above-described embodiments, the measuring results at each of the mutually orthogonal orientation components f and s have been utilized. Alternatively, however, with regard to the two orientation components obtained by rotating the orientation components f and s by the same angle $\delta$ (for example, +45°) in the same direction with respect to each other, the same measurements as the above-described cases may be performed, and then an average may be taken between these results and the results measured in the orientation components f and s. In this case, the rotating mechanism 13 for use in the polarization orientation setting member, the analyzer rotating mechanism 14, and further the polarization plane are controlled so as to be switched to the orientations thereof.

With regard to the average wavefront and the retardation, any one of them may be adopted as a measuring result.

As is evident from the foregoing, in accordance with the above-described embodiments, a measuring device and a measuring method is achieved which allow the retardation and the average wavefront of lens or other optical materials wherein birefringence exists, to be measured with a high accuracy.

In particular, by utilizing the interferometer, the average wavefront and the retardation of lens to be measured including birefringence can be accurately measured. This enables the correction of the lens to be measured, and/or the simulation of the imaging performance thereof to be performed with a high accuracy.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A measuring device comprising:
   a light source for emitting a linearly polarized light;
   polarization orientation setting means for switching the polarization orientation of the light flux from said light source means between at least two orientations and making the light flux exit;
   light re-combining means for re-combining light fluxes split from the light flux from said polarization orientation setting means after passing the light fluxes through an object to be measured and a reference surface;
   analyzing means for switching the polarization orientation so as to allow to pass only the same polarized component as the polarized light incident on the object to be measured;
   image pickup means for detecting interference information of the light which has passed through said analyzing means; and
   calculating means for calculating at least one of the average wavefront and the retardation of the object to be measured, on the basis of the interference information obtained when using the light in the two polarization states switched by said polarization orientation setting means.

2. A measuring device in accordance with claim 1, wherein said light re-combining means comprises a twyman-Green-type interferometer.

3. A measuring device in accordance with claim 1, wherein said light re-combining means comprises a Fizeau-type interferometer.

4. A measuring device comprising:
   a polarization orientation setting member, which is disposed in the optical path for light fluxes including a light flux incident on an object to be measured, and which has a function of switching the polarization orientation of the light fluxes including the light flux incident on the object to be measured between at least two orientations, and making the light fluxes exit;
   an image pickup member;
   an analyzer, which is disposed on the light incident side of said image pickup member, and which has a function of switching the polarization orientation so as to allow to pass only the same polarized component as the polarized light incident on the object to be measured, out of the interference light fluxes including the light flux which is made to exit from the object to be measured; and
   a calculating section connected to said image pickup member, said calculating section calculating at least one of the average wavefront and the retardation of the object to be measured, on the basis of wavefront information obtained from the output of said image pickup member, when using the light fluxes in the at least two polarization orientations switched by said polarization orientation setting member.

5. A measuring device in accordance with claim 4, wherein the interference light fluxes are formed by a twyman-Green-type interferometer.

6. A measuring device in accordance with claim 4, wherein the interference light fluxes are formed by a Fizeau-type interferometer.

7. A measuring method comprising:

arranging an object to be measured;

measuring a first interference pattern of a first linearly polarized light from the object to be measured;

measuring a second interference pattern of a second linearly polarized light from the object to be measured, wherein the first and the second linearly polarized lights are made incident on the object in mutually different polarization orientations; and calculating at least one of a retardation and an average wavefront of the object on the basis of the first interference pattern and the second interference pattern.

8. A measuring method in accordance with claim 7, wherein the difference of the polarization orientation between the first and second linearly polarized lights is 90 degrees.

9. An interferometer comprising:

a light source for emitting linearly polarized light;

polarization orientation changing means for changing a polarization orientation of the polarized light incident on an object to be measured;

analyzing means for switching the polarization orientation so as to allow to pass only the same polarized component as the polarized light incident on the object to be measured; and image pickup means for detecting the polarized light after passing through the object to be measured as an interference signal.

10. An interferometer in accordance with claim 9, further comprising a calculating means for calculating at least one of a retardation and an average wavefront of the object to be measured.

11. A measuring method comprising the step of:

arranging an object to be measured;

making linearly polarized light incident on the object;

passing the light from the object through an analyzer so as to allow to pass only the same polarized component as the polarized light incident on the object;

measuring the interference patterns of the light passed through the analyzer; and calculating at least one of a retardation and an average wavefront from the object on the basis of the measured interference patterns.

* * * * *

UNITED STATES PATENT AND TRADEMARK OFFICE
CERTIFICATE OF CORRECTION

PATENT NO. : 7,106,452 B2
APPLICATION NO. : 09/934713
DATED : September 12, 2006
INVENTOR(S) : Chidane Ouchi Page 1 of 1

It is certified that error appears in the above-identified patent and that said Letters Patent is hereby corrected as shown below:

COLUMN 3:
Line 29, "12." should read --12, will be discussed.--.
Line 42, "a," should read --α,--.

COLUMN 6:
Line 36, claim 2, "twyman-Green" should read --Twyman-Green--.
Line 67, claim 5, "twyman-Green" should read --Twyman-Green--.

COLUMN 8:
Line 12, claim 11, "step" should read --steps--.

Signed and Sealed this

Thirty-first Day of July, 2007

JON W. DUDAS
*Director of the United States Patent and Trademark Office*